United States Patent [19]

Allison et al.

[11] Patent Number: 4,839,154
[45] Date of Patent: Jun. 13, 1989

[54] PROCESS FOR CONVERTING SULFIDE ION TO INNOCUOUS, SOLUBILE SULFUR SPECIES

[75] Inventors: Joe D. Allison; Sally A. Thomas, both of Ponca City; Kang Yang, deceased, late of Ponca City, all of Okla., by Kumsu Yang, executrix

[73] Assignee: Conoco Inc., Ponca City, Okla.

[21] Appl. No.: 199,721

[22] Filed: May 31, 1988

Related U.S. Application Data

[63] Continuation of Ser. No. 947,442, Dec. 29, 1986, abandoned.

[51] Int. Cl.$^4$ ............................................. C01B 17/96
[52] U.S. Cl. .................... 423/544; 210/758; 210/755
[58] Field of Search ............... 423/571, 544; 210/755, 210/758

[56] References Cited

U.S. PATENT DOCUMENTS

| | | | |
|---|---|---|---|
| 1,771,518 | 7/1930 | Alder et al. | |
| 1,943,487 | 1/1934 | Ruth | 210/28 |
| 3,104,951 | 9/1963 | Urban | 423/573 |
| 3,471,254 | 10/1969 | Urban | 423/571 |
| 3,483,120 | 12/1969 | Hatch | 210/50 |
| 3,793,440 | 2/1974 | Schulze | 423/573 |
| 3,867,509 | 2/1975 | Geiger et al. | 423/224 |
| 3,929,637 | 12/1975 | Appleby et al. | 210/63 |
| 3,963,611 | 6/1976 | Dardenne-Ankrinla | 423/544 |
| 4,002,727 | 1/1977 | Sonoda et al. | 423/573 |
| 4,009,251 | 2/1977 | Meuly | 423/573 |
| 4,077,879 | 3/1978 | Smeck | 210/62 |
| 4,230,478 | 10/1980 | Zumbrunn | 71/21 |
| 4,256,485 | 3/1981 | Richardson | 423/544 |
| 4,264,451 | 4/1981 | Pope et al. | 210/721 |
| 4,292,293 | 9/1981 | Johnson et al. | 423/571 |
| 4,357,207 | 11/1982 | Yorke | 159/47 WL |
| 4,363,215 | 12/1982 | Sharp | 60/641.1 |
| 4,374,104 | 2/1983 | Primack | 423/226 |
| 4,393,037 | 7/1983 | Delaney et al. | 423/571 |
| 4,412,981 | 11/1983 | Kubicek | 423/573 |
| 4,443,342 | 4/1984 | Stas et al. | 210/763 |
| 4,455,236 | 6/1984 | Kim | 210/721 |
| 4,532,117 | 7/1985 | Delaney | 423/544 |
| 4,710,305 | 12/1987 | Allison et al. | 210/758 |

FOREIGN PATENT DOCUMENTS

| | | | |
|---|---|---|---|
| 82579 | 6/1983 | European Pat. Off. | 423/571 |
| 49-67438 | 6/1974 | Japan | 423/571 |
| 53-60389 | 5/1975 | Japan | 423/571 |
| 51-48561 | 4/1976 | Japan | 210/721 |
| 51-56568 | 5/1976 | Japan | 210/721 |
| 53-108874 | 9/1978 | Japan | 423/571 |
| 54-16844 | 2/1979 | Japan | 423/571 |
| 54-139258 | 10/1979 | Japan | 423/571 |
| 58-114786 | 7/1983 | Japan | 423/573 |
| 541968 | 3/1977 | U.S.S.R. | 423/571 |
| 673310 | 7/1979 | U.S.S.R. | 423/571 |
| 903304 | 2/1982 | U.S.S.R. | 423/571 |

OTHER PUBLICATIONS

Chem Abstract No. 92:46807w.
Chem Abstract No. 94:5827a.
Chem Abstract No. 86:60334x.
Chem Abstract No. 87:11387d.
Chem Abstract No. 80:141923y.
Chem Abstract No. 95:120944u.
Chem Abstract No. 82:127383a.
Chem Abstract No. 88:141140z.
Chem Abstract No. 88:157831m.
Chem Abstract No. 90:191863z.
Chem Abstract No. 91:128148a.

(List continued on next page.)

*Primary Examiner*—Anthony McFarlane

[57] ABSTRACT

A process for converting sulfide ion present in a solution to innocuous, water soluble sulfur species is provided. The process basically includes the steps of contacting the sulfide ion with an oxidizing agent to oxidize it to the water soluble sulfur species and admixing a surface active agent with the solution in an amount sufficient to inhibit precipitation of elemental sulfur and to promote subsequent oxidation. To enhance the formation of the water soluble sulfur species and to speed up the reaction, the oxidation reaction is conducted under alkaline conditions.

34 Claims, 4 Drawing Sheets

OTHER PUBLICATIONS

Chem Abstract No. 92:46556p.
Chem Abstract No. 92:152299s.
Chem Abstract No. 93:100847v.
Chem Abstract No. 93:137246z.
Chem Abstract No. 95:12032m.
Chem Abstract No. 96:11113x.
Chem Abstract No. 96:40230p.
Chem Abstract No. 96:148178s.
Chem Abstract No. 96:148181m.
Chem Abstract No. 99:76024a.
Chem Abstract No. 88:157804e.
Chem Abstract No. 75:122738r.
Article by Cabodi, Van and Hardison, *First Commercial Test is Success for Catalytic Hydrogen Sulfide Oxidation Process,* Oil and Gas Journal, p. 107 (Jul. 5, 1982).

PROCESS FOR CONVERTING SULFIDE ION TO INNOCUOUS, SOLUBILE SULFUR SPECIES

This application is a continuation of application Ser. No. 947,442, filed Dec. 29, 1986, now abandoned.

BACKGROUND OF THE INVENTION

1. Field of the Invention

The present invention relates generally to processes for converting sulfide ion to innocuous, water soluble sulfur species, and more particularly, but not by way of limitation, to a process for oxidizing sulfide ion present in solutions containing hydrogen sulfide to sulfate ion.

2. Description of the Prior Art

Sulfide ion is a naturally occurring species that can be a serious problem in many mining, metallurgical and chemical operations. The ion increases corrosivity of water and can be an environmental hazard. It is particularly a problem in the petroleum industry.

When oil is first produced from a subterranean oil formation, there is usually sufficient pressure to force the oil to at least the bottom of the well bore so that it can be pumped out. After a period of time, the pressure sometimes decreases and is no longer sufficient to displace the oil from the reservoir. Due to the fact that a large portion of oil often still remains in the formation after the primary production period has ended, a number of enhanced oil recovery techniques have been developed.

Flooding the formation with water and/or other aqueous solutions is a common secondary recovery or enhanced oil recovery technique. The water is injected into the formation by way of one or more injection wells to drive the remaining oil toward one or more production wells. The oil and water are then pumped out of the production well or wells. In some areas, the only available water for enhanced oil recovery projects must be produced directly from the oil fields. Unfortunately, oil field produced waters often contain a high content of hydrogen sulfide. Water contaminated with sulfide ion, commonly referred to as sour water, is very undesirable. The contaminated water can be highly toxic by inhalation, and is a strong irritant to eyes and mucous membranes. It can also be very corrosive. The bad attributes of sour water make it undesirable for use in flooding operations, and make it very difficult to dispose of.

There are chemicals that are sometimes added to injection water, particularly biocides, that can react with the hydrogen sulfide to form elemental sulfur particles that are difficult to handle. The hydrogen sulfide in the water may react with pipeline steel to form finely divided ferrous particles. Water containing elemental sulfur and/or ferrous particles can plug the reservoir face if it is injected to the reservoir prior to being treated.

Regardless of whether sour water is contaminated by sulfide ion from the reservoir or contaminated by sulfide ion prior to injection in the reservoir, it is difficult to dispose of. The disposal difficulties are due to the environmental and health hazards associated with the water. Permission from governmental agencies for sour water disposal is difficult to obtain. Recycling sour water increases corrosion inhibitor treatment requirements and increases the potential for chemical incompatibility problems.

In order to solve or lessen the above described problems associated with sour water, the toxic sulfide ion can be removed or converted into a water soluble, relatively safe species.

Various processes exist for removing sulfide ion from sour water. For example, hydrogen peroxide or chlorine may be used to oxidize the sulfide ion to elemental sulfur. These processes are suitable for systems that can handle elemental sulfur as an end product. In many applications, however, the precipitated sulfur is not desirable. This is particularly true in closed systems that may become blocked. The precipitated sulfur is colloidal in size and is difficult to filter. The market for elemental sulfur is primarily confined to industrial areas where the sulfur is converted to sulfuric acid.

Thus, there is a need for a process for converting sulfide ion present in aqueous solutions to noncorrosive, innocuous, water soluble sulfur species.

SUMMARY OF THE INVENTION

A process for converting sulfide ion present in a solution to innocuous, water soluble sulfur species is provided. The process basically includes the steps of admixing a surface active agent with the sulfide ion to inhibit formation of elemental sulfur and to facilitate the conversion, and oxidizing the sulfide ion to water soluble sulfur species. The sulfide ion can be oxidized to water soluble sulfur species by contacting the sulfide ion with an oxidizing agent for a period of time sufficient to convert the sulfide ion to sulfate ion.

Suitable surface active agents are those selected from the group consisting of polyoxyalkylene alkylphenols, polyoxyalkylene alcohols, metal salts of alkylbenzene sulfonic acids, alkyl ether sulfates, and quaternary amines.

Various techniques and/or oxidizing agents can be utilized for oxidizing the sulfide ion to innocuous, water soluble sulfur species. Suitable oxidizing agents include those selected from the group consisting of chlorine, hypochlorite, hydrogen peroxide, chlorine dioxode, sulfur dioxide, ozone and compounds containing a nitrogen-chlorine bond.

To enhance formation of sulfate ion as opposed to elemental sulfur and to speed up the rection, the pH of the reaction mixture can be adjusted to a level greater than 7.

The process of the present invention is particularly useful for removing sulfide ion from oil field produced waters, particularly waters associated with secondary recovery or enhanced oil recovery processes.

From the foregoing description of the present invention, it will be apparent that an important object of the invention is to provide a process for converting sulfide ion to innocuous, water soluble sulfur species. The surface active agent inhibits formation of elemental sulfur as an intermediate oxidation product and promotes subsequent oxidation. The process provided increases water flooding capabilities and makes disposal of the emerging waters easier to handle and environmentally safe.

BRIEF DESCRIPTION OF THE DRAWINGS

FIG. 2 is a graph showing the operability of chlorine in converting sulfide ion to water soluble sulfur species and have from about 10 to about 20 carbon atoms. The alcohols can be synthetically produced or can be derived from fat. They are ethoxylated with about 1 to about 50 moles of ethylene oxide per mole of alcohol. The ethoxylated alcohol is then sulfated and neutralized. A commercially available alkyl ether sulfate is "ALFONIC 1412S", which is marketed by Vista Chemical Company.

Anionic surface active agents can be used in accordance with the process of the present invention under relatively mild conditions in comparison to nonionic surface active agents. When nonionic surface active agents are used, stronger oxidizing agents and higher temperatures are required. Nonionic surface active agents, on the other hand, are preferred for use in brine solutions because anionic surface active agents tend to precipitate when admixed in brine solutions. Nonionic surface active agents are relatively insensitive to water hardness and salinity variations possible in the oil field. Anionic surface active agents sometimes tend to lose activity in hard water.

The nature of the mechanism by which anionic surface active agents inhibit precipitation of elemental sulfur and speed up the time of the reaction is not absolutely clear. However, it is believed the sulfur microsols possess a positive potential or delta charge, which appears to attract the negative charge of the anionic surface active agent. The surface active agent then displaces some of the waters of solvation and creates openings along the sulfur particles, which allows room for the oxidizing agent to act. The oxidizing agent contacts the particles and oxidizes them to water soluble sulfur species.

Cationic surface active agents and phase transfer catalysts can also be used as the surface active agent in the oxidation process. Preferred cationic surface active agents are quaternary amines such as n-alkyl dimethyl benzyl ammonium chloride and n-alkyl methyl ethyl benzyl ammonium chloride, and compounds containing at least one phosphine group or molecule. Preferred phase transfer catalysts include tetrabutylphosphonium chloride, tricapylylmethylammonium chloride and other quaternary salts.

The surface active agents, regardless of their type, inhibit the formation of elemental sulfur as an oxidation product and facilitate the oxidation process. Due to the water soluble and innocuous nature of the final oxidation product, the treated sulfide contaminated solution or water does not foul reservoirs and does not create disposal problems. The surface active agents decrease the total time required for the oxidation process to take place, thereby allowing the process to be carried out practically and economically in all types of operations.

Any oxidizing agent or oxidant that converts sulfide ion to water soluble sulfur species may be used in the process of the present invention. Preferred oxidizing agents include chlorine, hydroclorite, hydrogen peroxide, chlorine dioxide, sulfur dioxide, ozone and compounds containing a nitrogen-chlorine bond.

The chlorine in compounds containing a nitrogen-chlorine bond is readily released in aqueous solutions and serves as a powerful oxidant. Exemplary of this type of compound are inorganic and organic chloramines. The use of a nitrogen chlorinated triazine or nitrogen chlorinated derivative thereof as an oxidizing agent to convert sulfide ion to water soluble sulfur species is described in out copending application entitled "PROCESSES AND OXIDIZING AGENTS FOR OXIDIZING SULFIDE ION TO INNOCUOUS, SOLUBLE SULFUR SPECIES" filed simultaneously herewith, the disclosure of which is hereby incorporated by reference herein.

Other suitable oxidants include air and oxygen. Preferably, the oxidation reaction with air or oxygen is carried out in the presence of activated carbon and under alkaline conditions. The advantages of operating under alkaline conditions are discussed below. Electrolytic oxidation processes can also be used to oxidize the sulfide ion to water soluble sulfur species.

More than one oxidizing agent can be used in the oxidation process. For example, hypochlorite and chlorine can be added to the reaction solution at the same time or one after the other. When nonionic surface active agents are used, the hypochlorite quickly oxidizes the sulfide ion to sulfur while the chlorine oxidizes the sulfur to water soluble sulfur species.

Of the wide variety of oxidizing agents or oxidants that may be used, chlorine and hypochlorite are particularly suitable. Chlorine is very easily injected into water treatment systems. In the hypochlorite anion, the chlorine atom is in the $+1$ oxidation state and is very easily reduced to the stable $-1$ oxidation state (chloride ion). The positive potential of the sulfur particles attracts the negative charge of the hypochlorite ion.

Preferably, the oxidation reaction is conducted under alkaline conditions to enhance the formation of sulfate ion. The pH of the reaction mixture or solution can be adjusted to minimize the time required to convert the sulfide ion to water soluble sulfur species. Preferably, the pH is adjusted to a level in the range of from about 7.0 to about 14. Most preferably, the pH is adjusted to about 12.

The pH can be adjusted by introducing any alkaline compound to the reaction mixture or solution. For example, sodium hydroxide or other compounds containing a hydroxide group can be used. In secondary oil recovery processes or other processes associated with aqueous hydrogen sulfide, ammonia gas can be easily injected into the aqueous solution to adjust the pH. Ammonium hydroxide may also be used to introduce ammonia to the reaction mixture or solution. Both the ammonium ion and the hydroxide ion are important to the sulfide oxidation reaction. The ammonium ion is perhaps the most important.

When ammonia is used, it is preferably added in an amount sufficient to make the ammonia concentration of the mixture or solution at least about 0.3% by weight of the solution. When anionic surface active agents are used, the ammonium is preferably added in an amount sufficient to make the ammonia concentration from about 0.5% to about 1.6% by weight, most preferably about 0.7% by weight of the solution.

Ammonium salts such as ammonium chloride and ammonium sulfate can also be added to the reaction solution to increase the pH thereof. When hypochlorite is used as an oxidizing agent, the ammonium cation of the salts reacts with the hypochlorite to form chloramine, which may serve as the final oxidant in the oxidation process. The use of ammonium salts can decrease the level of pH required for efficient oxidation.

The oxidation process is preferably carried out at a temperature in the range of from about 25° C. to about 80° C. Most preferably, the temperature is about 50° C.

Although the amount of surface active agent required depends upon the particular one or ones employed and upon other reaction conditions, the surface active agent without a surface active agent present in the reaction solution.

DETAILED DESCRIPTION OF THE PREFERRED EMBODIMENTS

In accordance with the present invention, a process for converting sulfide ion to innocuous, water soluble sulfur species is provided. A surface active agent is admixed with the sulfide ion to facilitate the conversion and the sulfide ion is oxidized to the water soluble sulfur species.

The process can be used to oxidize sulfide ion to innocuous, water soluble sulfur species in any type of operation. It is particularly useful for converting sulfide ion present in aqueous hydrogen sulfide solutions to sulfate ion. The sulfide ion present in a solution may be oxidized by contacting the solution with an oxidizing agent. Other forms of oxidation may be used as well. The surface active agent is admixed with the solution in an amount sufficient to inhibit precipitation of elemental sulfur and to promote subsequent oxidation. The surface active agent may be added before, at the same time as, or after the sulfide ion is contacted with the oxidizing agent or other oxidizing procedure is conducted. More than one surface active agent may be utilized.

The surface active agent acts to reduce the surface tension or interfacial tension between the sulfide ions and water. It holds the sulfur microparticles in solution by wetting their surface and breaks down the solvation layer of water around the microparticles before they agglomerate, thereby delaying precipitation. The delay in precipitation is significant in that it allows time for the oxidizing agent to attack.

Within each molecule or ion of a surface active agent, there is a group that is lyophilic toward the dispersing medium or solvent and a group that is lyophobic toward the same. The dual nature of the molecules or ions, i.e., the fact that each molecule or ion of the surface active agent has both a hydrophilic group and a hydophobic group, enables the surface active agent to reduce surface and interfacial tension.

Any surface active agent that inhibits formation of elemental sulfur as an intermediate oxidation product may be utilized in accordance with the present invention. It can be of the nonionic, anionic or cationic type. Surface active agents acting as phase transfer catalysts may be used as well. The particular surface active agent or agents employed will depend upon the conditions surrounding the oxidation process.

Most suitable nonionic surface active agents are composed of the condensation products of ethylene oxide and propylene oxide with hydrophobic organic molecules attached thereto. These surface active agents contain an average of from about 6 to about 100 moles of alkylene oxide per mole of hydrophobe. Examples of nonionic surface active agents that may be utilized are polyoxyalkylene alkylphenols and polyoxyalkylene alcohols.

The polyoxyalkylene alkylphenols are perferably compounds of the formula:

wherein:

$R_1$ is an alkyl group having at least 4 carbon atoms and $R_2$ is a substituent group containing either repeating ethylene oxide units or repeating propylene oxide units present in a ratio of at least 3 moles of alkylene oxide per mole of alkylphenol. The substituent groups may be attached to the benzene ring in any position with respect to each other. The hydrophobic portion of the surface active agent includes the phenolic nucleus and the substituent alkyl group, whereas the hydrophilic portion includes the remainder of the molecule.

Preferably, $R_1$ has from about 8 to about 12 carbon atoms and the ethylene oxide or propylene oxide units of $R_2$ are present in a ratio in the range of from about 6 to about 100 moles of alkylene oxide per mole of alkylphenol. Ethoxylated nonylphenols are exemplary of this group of compounds. When ethoxylated nonylphenol is used, the ethylene oxide is preferably present in the $R_2$ group in a ratio of about 40 moles ethylene oxide per mole of nonylphenol.

The polyoxyalkylene alcohols are preferably of the formula:

$$R-Z$$

wherein:

Z is an alcohol group having from about 8 to about 22 carbon atoms and R is a substituent group containing either repeating ethylene oxide units or repeating propylene oxide units present in a ratio of at least 3 moles alkylene oxide per mole of alcohol. The hydrophobic group is the alcohol group which can be derived from natural or synthetic primary or secondary straight chain fatty alcohols. The hydrophilic group includes the remainder of the molecule. Most preferably, R includes from about 5 to about 100 moles of ethylene oxide or propylene oxide per mole of alcohol.

Anionic surface active agents that may be utilized with the process of the present invention include metal salts of alkylbenzene sulfonic acids and alkyl ether sulfates. Other anionic surface active agents may also be used.

The alkyl group of the metal salts of the alkylbenzene sulfonic acids preferably has from about 9 to about 15 carbon atoms. Most preferably, the alkyl group is a straight chain having about 12 carbon atoms. An example of a suitable alkylbenzene sulfonate is "VISTA C550", which is commercially marketed by Vista Chemical Company.

Suitable alkyl ether sulfates are preferably compounds of the formula $$R-O-(C_2H_4O)_n-SO_3-M$$

wherein:

R is an alkyl or alkenyl group, n is from 1 to 50, and M is a water soluble cation. R preferably has from about 10 to about 20 carbon atoms.

Most suitable alkyl ether sulfates are condensation products of ethylene oxide and monohydric alcohols is preferably added to the sulfide containing solution in an amount or at a rate whereby the resulting solution contains surface active agent in the range of from about 5 to about 10,000 parts of surface active agent per million parts of the solution. Most preferably, the solution contains surface active agent in an amount of about 100 parts surface active agent per million parts of solution.

The amount of oxidizing agent or other oxidant to use will depend upon the type of operation and upon othe reaction conditions. Generally, however, when an oxidizing agent is used, it is combined with the sulfide containing solution in an amount whereby the resulting solution contains oxidizing agent in an amount in the range of from about 0.001% to about 1.0% by weight of the solution.

In order to illustrate and facilitate a clear understanding of the process of this invention, the following examples are given.

EXAMPLE I

Various nonionic surface active agents are tested for their ability to reduce the time required for one or more oxidizing agents to oxidize sulfide ion to water soluble sulfur species. The effect of ammonia on the oxidation process is also determined. The surface active agents tested are an ethoxylated nonylphenol having an ethylene oxide content of 40 moles per mole of nonylphenol and an ethoxylated nonylphenol having an ethylene oxide content of 15 moles per mole of nonylphenol. The tests are run with and without the surface active agents present. The oxidizing agents used for the tests are chlorine and hypochlorite. The concentration of ammonia present in the reaction solution is varied for each test. In the first test, no ammonia is added. The 40-mole ethoxylated nonylphenol is tested at two different concentrations.

A stock solution of sodium sulfide ($Na_2S.9H_2O$) is prepared containing 360 ppm sulfide ion and 1% sodium chloride in deionized water. For each test, 75 milliliters of the stock solution are placed and stirred in a 250 milliliter beaker, which is positioned on a hot plate for heating the solution. A sulfide ion specific electrode (ISE) is used to monitor the concentration of sulfide ion present in the reaction solution and the disappearance of the sulfide ion. The disappearance of sulfur precipitate is visually determined. The reaction solution is heated to a temperature of 100°–110° F. prior to the introduction of the oxidizing agent or agents. The temperature is monitored with a thermometer. The ammonia concentration is adjusted by adding ammonium hydroixide ($NH_4OH$) to the reaction solution. The time is manually monitored.

In the tests conducted with surface active agent present, the surface active agent is added to the reaction solution prior to the addition of the oxidizing agent or agents in an amount sufficient to achieve the particular surface active agent concentration.

To add the chlorine, a gas dispersion tube (medium fritted glass) is introduced to the reaction solution. Chlorine gas is then purged through the reaction solution at a rate of 150 milliliters per minute as adjusted with a chlorine gas regulator. In the tests utilizing a combination of chlorine and hypochlorite as oxidizing agents, the hypochlorite is introduced by adding 25 milliliters of sodium hypochlorite (CLOROX®) to the reaction solution over a 15–30 second period. The hypochlorite is added 10 seconds after the chlorine is first introduced.

The results of the tests are summarized in Table I below. As shown by the results, the addition of ammonia to the reaction solution increases the rate of the reaction considerably. In an alkaline solution with no surface active agent present and chlorine serving as the sole oxidizing agent, the sulfur precipitates and is present for about 8 minutes. It takes almost that much time for all of the sulfide ion to disappear.

In the test conducted with surface active agent present, elemental sulfur is converted to water soluble sulfur species in a short amount of time. The precipitate disappears faster in the tests conducted with high concentrations of ammonia present in the solutions. Under certain conditions, the sulfur does not precipitate at all. The rate of the overall reaction is increased to a great extent by adding hypochlorite after the chlorine is first introduced. The addition of the hypochlorite causes the sulfide ion to be eliminated very quickly.

TABLE I

| Test No.[1] | Surface Active Agent | $[NH_3]$[2], % | $[OCl^-]$[3], % | Disappearance of $S^=$[4], min. | Disappearance of Precipitate, min. |
|---|---|---|---|---|---|
| 1. | — | — | — | 23 | 45 |
| 2 | — | 3.8 | — | 7 | 8 |
| 3 | A[5] | 3.4 | — | 9 | N.O.[8] |
| 4 | A | 1.8 | 0.2 | <0.25 | N.O. |
| 5 | A | 0.72 | 0.15 | <0.25 | 1 |
| 6 | A | — | 0.25 | <0.25 | 5 |
| 7 | B[6] | 3.4 | 0.13 | <0.25 | 4 |
| 8 | B | 2.6 | 0.14 | <0.25 | 4 |
| 9 | B | 1.2 | 0.14 | <0.25 | 5 |
| 10 | B | 0.56 | 0.15 | <0.25 | 5 |
| 11 | C[7] | — | 0.70 | <0.25 | >40 |

[1]All tests included introduction of chlorine (150 milliliters per min.), except for test no. 11 in which no chlorine was introduced.
[2]$[NH_3]$ = ammonia concentration.
[3]$[OCl^-]$ = hypochlorite concentration.
[4]$S^=$ = sulfide ion.
[5]A = 80 ppm of 40-mole ethoxylated nonylphenol.
[6]B = 110 ppm of 15-mole ethoxylated nonylphenol.
[7]C = 100 ppm of 40-mole ethoxylated nonylphenol.
[8]N.O. = none observed.

From Table I, it can be seen that nonionic surface active agents, particularly ethoxylated nonylphenols, facilitate the oxidation of sulfide ion to water soluble sulfur species. The speed of the reaction is increased considerably and conditions can be adjusted such that no sulfur precipitation occurs. Chlorine and chlorine/hypochlorite combinations work well as oxidizing agents. Ammonia is very important to the oxidation process in that the addition of ammonia increases the rate of the reaction to a great extent.

EXAMPLE II

Various anionic surface active agents are tested for their ability to facilitate the oxidation process. The effect of ammonia on the oxidation process is also determined. The surface active agents tested are "ALFONIC 1421S", an alkyl ether sulfate, and "VISTA C550", an alkylbenzene sulfonate, both marketed by Vista Chemical Company. The oxidizing agents used for the tests are chlorine and a combination of chlorine and hypochlorite. Various concentrations of each surface active agent are tested. The ammonia concentration in the reaction solution is varied for each test.

A stock solution of sodium sulfide ($Na_2S.9H_2O$) is prepared containing 470 ppm sulfide ion and 1% sodium chloride in deionized water. For each test, 75 milliliters of the stock solution are placed and stirred in a 250 milliliter beaker, which is positioned on a hot plate for heating the solution. The initial sulfide ion concentration and the disappearance of the sulfide ion are measured with a sulfide ion specific electrode (ISE). The disappearance of sulfur precipitate is visually determined. The particular surface active agent tested is added to the reaction solution in an amount sufficient to achieve the particular surface active agent concentration. After the surface active agent is added, the reaction solution is heated to the desired temperature. The temperature is monitored with a thermometer. The ammonia concentration is adjusted by adding ammonium hydroxide ($NH_4OH$) to the reaction solution. The time is manually monitored.

Chlorine is used as the oxidizing agent in each test. Chlorine gas is purged through the reaction solution at a rate of 150 milliliters per minute. In all but the sixth test, hypochlorite is introduced as an additional oxidizing agent. The hypochlorite is introduced by adding an appropriate amount of sodium hypochlorite (CHLOROX ®) to achieve the desired hypochlorite concentration. The sodium hypochlorite is added over a 30 second period.

The results of these tests are summarized in Table II below. When the alkyl ether sulfate is used as the surface active agent, the sulfide ion is depleted almost immediately upon the addition of the oxidizing agent or agents. In most cases, elemental sulfur does not precipitate. The rapid reaction occurs at both room temperature and an elevated temperature. Without ammonia present in the solution, a white precipitate does form, but disappears in about three minutes. Similar results are obtained when the alkylbenzene sulfonate is used as the surface active agent. The only difference is that with the alkylbenzene sulfonate, a white precipitate forms and persists for over fifteen minutes at room temperature.

TABLE II

| Test No.[1] | Surface Active Agent (Con. in ppm) | $[NH_3]$[2], % | $[OCl^-]$[3], % | T, °C. | Disappearance of $S^=$[4], min. | Disappearance of Prec, min. |
|---|---|---|---|---|---|---|
| 1 | — | — | 0.50 | 80 | <0.25 | >60 |
| 2 | A[5](333) | 1.6 | 0.42 | 80 | <0.50 | N.O.[7] |
| 3 | A(282) | 0.0 | 0.47 | 80 | <0.50 | 3 |
| 4 | A(276) | 0.67 | 0.46 | 80 | <0.50 | N.O. |
| 5 | A(345) | 0.67 | 0.46 | 25 | <0.50 | N.O. |
| 6 | A(103) | 0.67 | 0.46 | 25 | <0.50 | N.O. |
| 7 | A(118) | 0.38 | 0.0 | 25 | <0.50 | N.O. |
| 8 | B[6](98) | 0.67 | 0.46 | 80 | <0.50 | N.O. |
| 9 | B(101) | 0.0 | 0.47 | 80 | <0.50 | 3 |
| 10 | B(98) | 0.67 | 0.46 | 25 | <0.50 | >15 |

[1] Chlorine was introduced to the reaction solution at a rate of 150 milliliters per minute with each test.
[2] $[NH_3]$ = ammonia concentration.
[3] $[OCl^-]$ = hypochlorite concentration.
[4] $S^=$ = sulfide ion.
[5] A = alkyl ether sulfate ("ALFONIC 1412S").
[6] B = alkylbenzene sulfonate ("VISTA C550").
[7] N.O. = none observed.

Thus, anionic surface active agents promote the oxidation of sulfide ion by chlorine or a combination of chlorine and hypochlorite to water soluble sulfur species without the precipitation of elemental sulfur as an intermediate oxidation product. As with nonionic surface active agents, ammonia is very important to the oxidation process.

EXAMPLE III

Hypochlorite and chlorine are each tested for their ability to oxidize sulfide ion to water soluble sulfur species. The tests are run without adding a surface active agent to the reaction solutions. A stock solution of sodium sulfide ($Na_2S \cdot 9H_2O$) is made to contain 300 to 400 ppm sulfide ion and 1% sodium chloride in deionized water. For each test, 75 milliliters of the stock solution are placed and stirred in a 250 milliliter beaker. The beaker is positioned on a hot plate. A sulfide ion specific electrode (ISE) is used to monitor the concentration of the sulfide ion present in the solutions. The temperature of the solutions is monitored with a thermometer. The time is manually monitored.

In a first test, 25 milliliters of sodium hypochlorite (CHLOROX ®) are added to the reaction solution over a period of 15–30 seconds. The time is noted when the hypochlorite is first added. Millivolt output measurements and visual observations are made and recorded every 30 seconds. The results of this test are shown in Table III below. As indicated by the results, the sulfide ion depletes in a short amount of time. Sulfur precipitate, however, remains for longer than 180 minutes (3 hours).

TABLE III

| Temperature, °C. | Disappearance of $S^=$, min.[1] | Disappearance of Prec, min.[2] |
|---|---|---|
| 25 | <0.5 | >180 |
| 43 | <0.5 | >180 |

[1] Monitored by a sulfide ion specific electrode (ISE).
[2] Visually determined.

Figure 1:
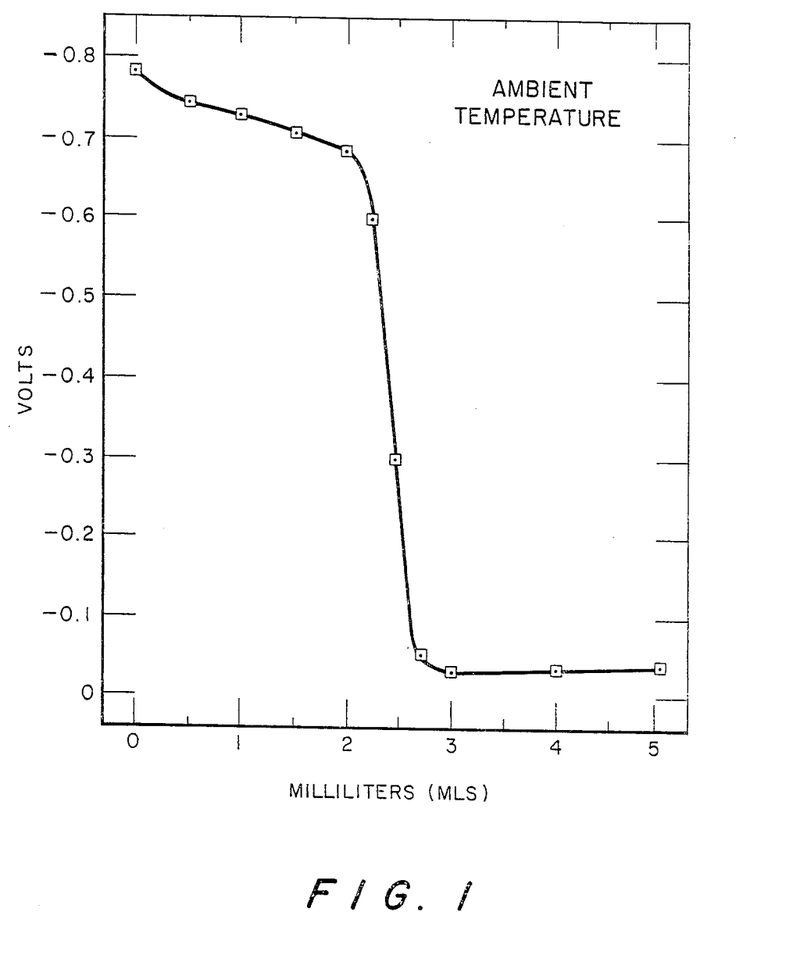
FIG. 1 is a graph showing the operability of hypochlorite in converting sulfide ion to water soluble sulfur species without a surface active agent present in the reaction solution.

In a second test, the sodium hypochlorite (CHLOROX ®) is added to the reaction solution in 0.25 milliliter increments. The test is run at 25° C. Millivolt output measurements and visual observations are made and recorded after each addition of hypochlorite. The voltage output of the sulfide ion specific electrode (ISE) (determinative of sulfide ion concentration) is plotted against the milliliters of sodium hypochlorite added in a graph, which is shown in FIG. 1 of the drawings. The depletion of sulfide is dependent directly upon the rate of hypochlorite addition. The test is repeated at 43° C., and no increase in the oxidation rate is observed.

In a third test, chlorine is added to the reaction solution by purging chlorine gas through the solution at a rate of 150 milliliters per minute. Millivolt output measurements and visual observations are made and recorded every 30 seconds. The results of the test are shown in Table IV below. The sulfide ion disappears at each temperature after 6–8 minutes have elapsed. At room temperature, the sulfur precipitate persists for over an hour. At elevated temperatures, the precipitate disappears more rapidly.

TABLE IV

| Temperature, °C. | Disappearance of $S^=$, min.[1] | Disappearance of Prec, min.[2] |
|---|---|---|
| 25 | 6.5 | 70 |
| 41 | 8 | 45 |
| 71 | 6.5 | 25 |

[1] Monitored by a sulfide ion specific electrode (ISE).
[2] Visually determined.

Thus, the tests confirm the importance of alkaline conditions and a surface active agent to the oxidation process. Hypochlorite by itself is not sufficient to oxidize sulfide ion to water soluble sulfur species. Although chlorine performs better than hypochlorite, elemental sulfur does form as an oxidation product.

EXAMPLE IV

Various basic compounds are tested to determine their effect on the oxidation of sulfide ion to water soluble sulfur species. The tests are run without adding a surface active agent to the reaction solutions. A solution of sodium sulfide ($Na_2S \cdot 9H_2O$) is prepared containing 300 to 400 ppm sulfide ion and 1% sodium chloride in deionized water. For each test, 75 milliliters of the stock solution are placed and stirred in a 250 milliliter beaker which is placed on a hot plate. The temperature of the reaction solution is monitored with a thermometer. A sulfide ion specific electrode (ISE) is used to monitor the concentration of sulfide ion present in the solutions. The time is manually monitored. In each test, chlorine is used as the oxidizing agent. Chlorine gas is continuously purged through the reaction solutions at a rate of 150 milliliters per minute. Millivolt output measurements and visual observations are made and recorded every 30 seconds. The voltage output of the sulfide ion specific electrode (ISE) is plotted against time in a graph.

Figure 2:
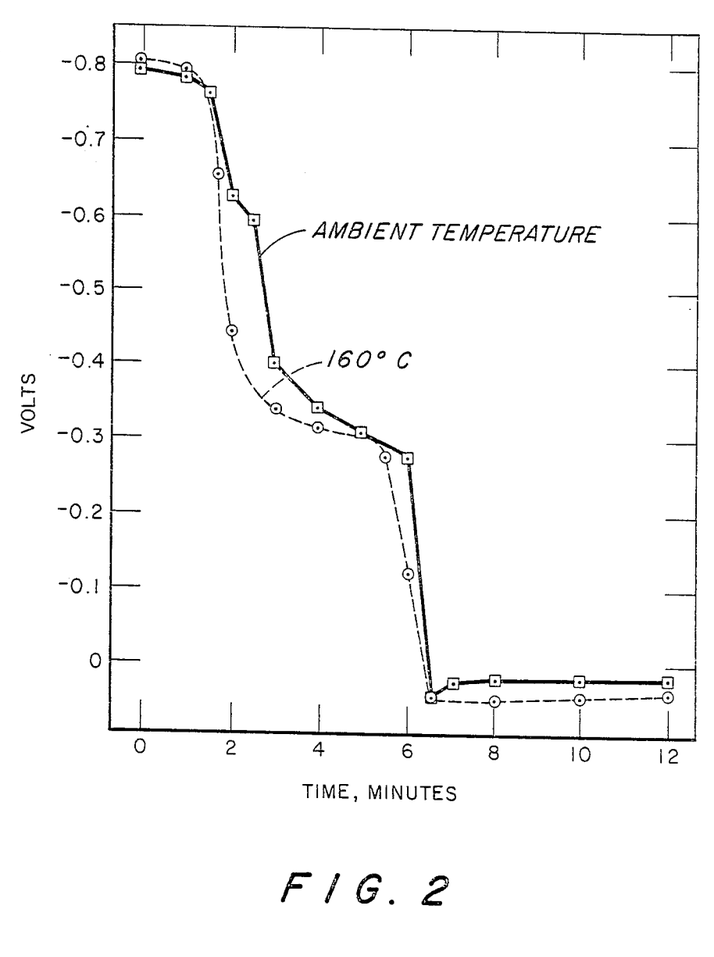

For comparative purposes, an alkali is not added to the solution in a first test. The first test is conducted at ambient temperature and at 160° C. The results are shown in FIG. 2 of the drawings.

Figure 3:
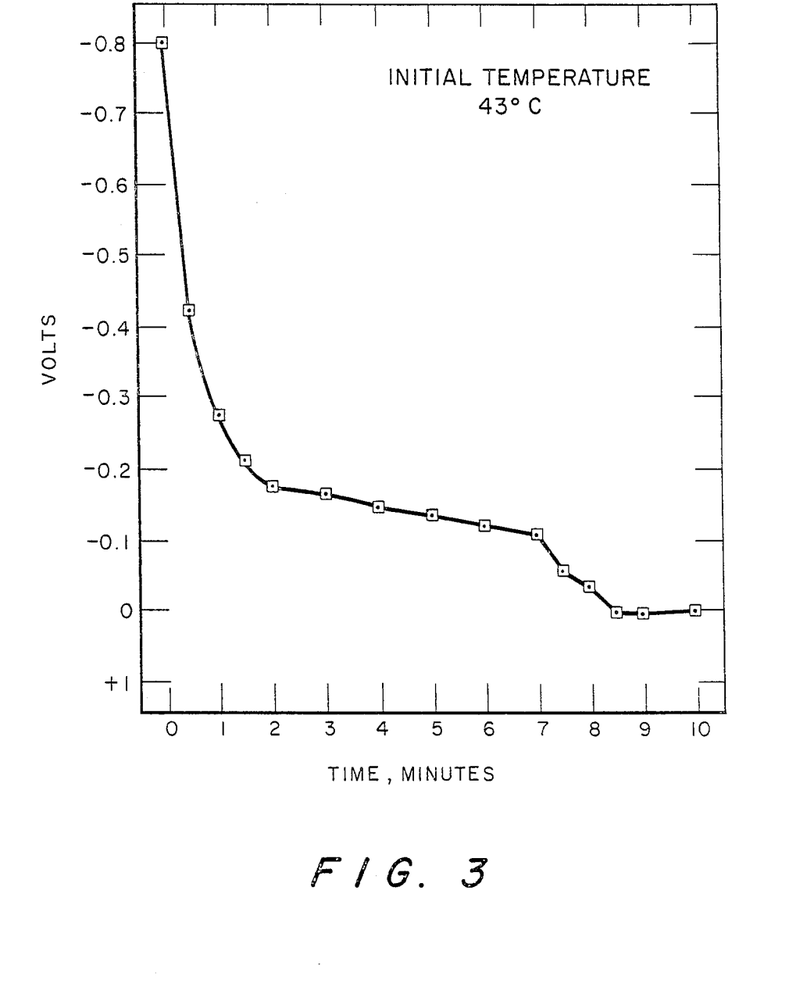
FIG. 3 is a graph showing the operability of ammonium ion in enhancing the oxidation of sulfide ion to water soluble sulfur species by chlorine.

In a second test, a solution containing 29% by weight ammonium hydroxide is added to the reaction solution in an amount sufficient to make the ammonia concentration 3.8% by weight of the solution. With 3.8% by weight ammonia, the pH of the solution is about 12. The initial temperature of the reaction solution is 43° C. When the chlorine is first added, the temperature of the reaction solution increases to 71° C. The results of the second test are shown in FIG. 3 of the drawings. As shown, the majority of the sulfide ion is oxidized to elemental sulfur in less than 2 minutes. The sulfur precipitate disappears within about 8 minutes. The second test is repeated with ammonia present in a concentration of 1.8% by weight of the solution. As with 3.8% ammonia, sulfide ion disppears quickly. Sulfur precipitate, however, persists for about 25 minutes.

To evaluate the role of hydroxide ion in the reaction, a solution containing 50% by weight sodium hydroxide (NaOH) is added to the stock solution in a third test in an amount sufficient to increase the pH of the solution to about 12 (the same pH obtained with the 3.8% $NH_4OH$). The initial temperature of the reaction solution is 43° C.

Figure 4:
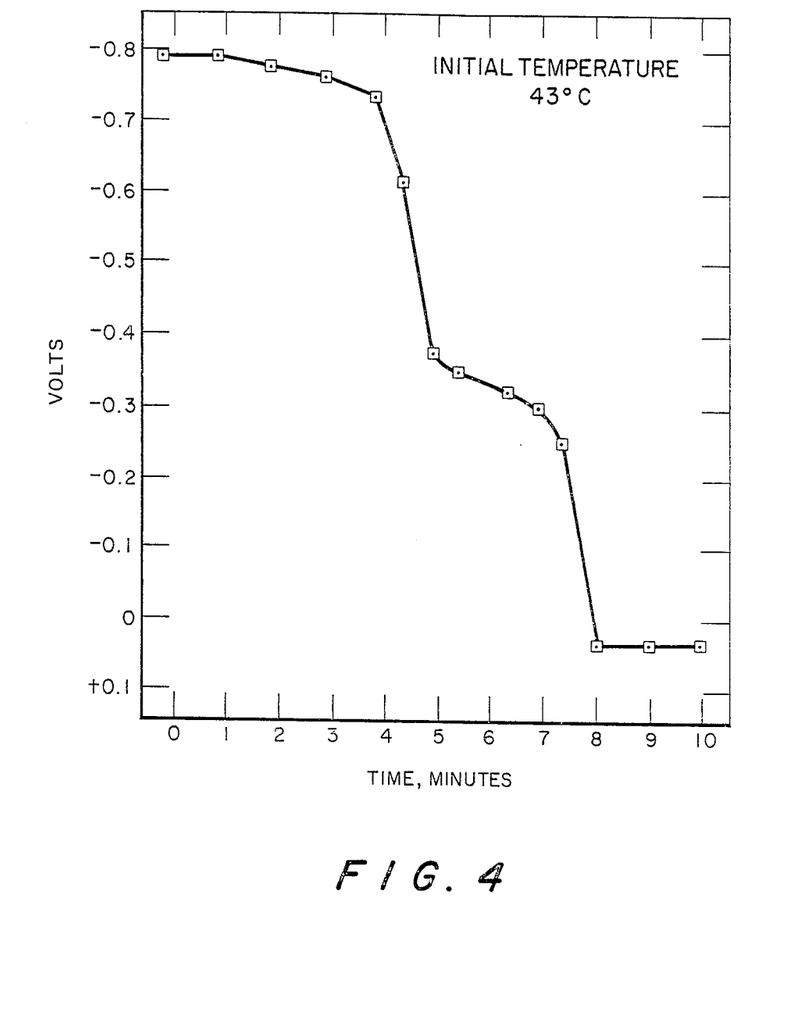
FIG. 4 is a graph showing the operability of hydroxide ion in enhancing the oxidation of sulfide ion to water soluble sulfur species by chlorine.

The results of the third test are shown in FIG. 4 of the drawings. As shown, the sulfide ion disappears in two steps, with most of the sulfide ion disappearing within about 8 minutes. Sulfur precipitate remains until about 30 minutes after the chlorine is first added. The temperature remains relatively stable.

Thus, the addition of a basic compound to the reaction solution enhances the oxidation of sulfide ion to water soluble sulfur species. The oxidation reaction proceeds much faster when the basic compounds are added. The sudden temperature rise when the ammonium hydroxide is added in the second test may be due to the heat of formation of chloramine ($NH_2Cl$). The chloramine acts to oxidize the elemental sulfur to water soluble sulfur species. The results obtained by adding sodium hydroxide (NaOH) to the reaction solution are not as good as those obtained using ammonium hydroxide. Thus, the ammonium ion is more important than the hydroxide ion to the oxidation process.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for converting sulfide ion present in water which is produced is an oil field, to innocuous water soluble sulfur species, said process consisting essentially of:

admixing an effective amount of a surface active agent with said water to reduce the surface tension between said sulfide ion and said water thereby inhibiting formation of elemental sulfur and facilitating said conversion; and oxidizing said sulfide ion to said water soluble sulfur species.

2. The process of claim 1 wherein said sulfide ion is oxidized to said water soluble sulfur species by contacting said sulfide ion with an oxidizing agent.

3. The process of claim 2 wherein said surface active agent is a nonionic compound.

4. The process of claim 2 wherein said surface active agent is an anionic compound.

5. The process of claim 2 wherein said surface active agent is a cationic compound.

6. The process of claim 2 wherein said surface active agent is selected from the group consisting of polyoxyalkylene alkylphenols, polyoxyalkylene alcohols, metal salts of alkylbenzene sulfonic acids, alkyl ether sulfates, and quaternary amines.

7. The process of claim 6 wherein said surface active agent is a polyoxyalkylene alkylphenol.

8. The process of claim 7 wherein said polyoxyalkylene alkylphenol is a compound of the formula:

wherein:
  $R_1$ is an alkyl group having at least four carbon atoms; and
  $R_2$ is a substituent group containing repeating alkylene oxide units selected from the group consisting of ethylene oxide and propylene oxide present in a ratio of at least 3 moles of alkylene oxide per mole of alkylphenol.

9. The process of claim 8 wherein $R_1$ has from about 8 to about 12 carbon atoms.

10. The process of claim 8 wherein $R_2$ contains repeating alkylene oxide units present in a ratio in a range of from about 6 to about 100 moles of alkylene oxide per mole of alkylphenol.

11. The process of claim 8 wherein:
  $R_1$ has nine carbon atoms; and
  $R_2$ contains repeating ethylene oxide units present in a ratio of about 40 moles ethylene oxide per mole of alkylphenol.

12. The process of claim 6 wherein said surface active agent is a polyoxyalkylene alcohol.

13. The process of claim 12 wherein said polyoxyalkylene alcohol is a compound of the formula:

R—Z wherein:
Z is an alcohol group having from about 8 to about 22 carbon atoms; and
R is a substituent group containing repeating alkylene oxide units selected from the group of ethylene oxide and propylene oxide present in a ratio of at least 3 moles of alkylene oxide per mole of alcohol.

14. The process of claim 13 wherein R contains repeating alkylene oxide units present in a ratio in the range of from about 5 to about 100 moles of alkylene oxide per mole of alcohol.

15. The process of claim 6 wherein said surface active agent is a metal salt of an alkylbenzene sulfonic acid.

16. The process of claim 15 wherein the alkyl group of said metal salt of said alkylbenzene sulfonic acid has from about 9 to about 15 carbon atoms.

17. The process of claim 16 wherein said alkyl group is a linear chain and has about 12 carbon atoms.

18. The process of claim 6 wherein said surface active agent is an alkyl ether sulfate.

19. The process of claim 18 wherein said alkyl ether sulfate is a compound of the formula:

$R-O-(C_2H_4O)_n-SO_3-M$ wherein:
R is alkyl or alkenyl group;
n is from 1 to about 50; and
M is a water soluble cation.

20. The process of claim 19 wherein R has from about 10 to about 20 carbon atoms.

21. The process of claim 6 wherein said surface active agent is a quaternary amine.

22. The process of claim 21 wherein said quaternary amine is selected from the group consisting of n-alkyl dimethyl benzyl ammonium chloride and n-alkyl methyl ethyl benzyl ammonium chloride.

23. The process of claim 2 wherein said oxidizing agent is selected from the group consisting of chlorine, hypochlorite, hydrogen peroxide, chlorine dioxide, sulfur dioxide and ozone.

24. The process of claim 2 wherein said oxidizing agent is air or oxygen, and said oxidizing step is carried out in the presence of activated carbon.

25. The process of claim 1 wherein said sulfide ion is oxidized to said water soluble sulfur species by contacting said sulfide ion with chlorine and hypochlorite.

26. The process of claim 1 wherein said sulfide ion is oxidized to said water soluble sulfur species by electrolytic oxidation.

27. The process of claim 1 wherein said sulfide ion is present in the form of a solution with the water and wherein the pH of said solution is adjusted to a level which minimizes the time required to convert said sulfide ion to said water soluble sulfur species.

28. The process of claim 27 wherein said pH of said solution is adjusted to a level in the range of from about 7.0 to about 14.

29. The process of claim 27 wherein said pH is adjusted by adding ammonia to said solution.

30. The process of claim 29 wherein said ammonia is present in said solution in a concentration of at least about 0.3% by weight of the solution.

31. The process of claim 1 wherein said process is carried out at a temperature in the range of from about 25° C. to about 80° C.

32. The process of claim 31 wherein said temperature is about 50° C.

33. The process of claim 27 wherein said surface active agent is added to said sulfide ion solution in an amount whereby the resulting solution contains surface active agent in the range of from about 5 to about 10,000 parts surface active agent per million parts of the solution.

34. The process of claim 33 wherein said surface active agent is added to said solution in an amount whereby said solution contains about 100 parts surface active agent per million parts of solution.

* * * * *